Figure 1:
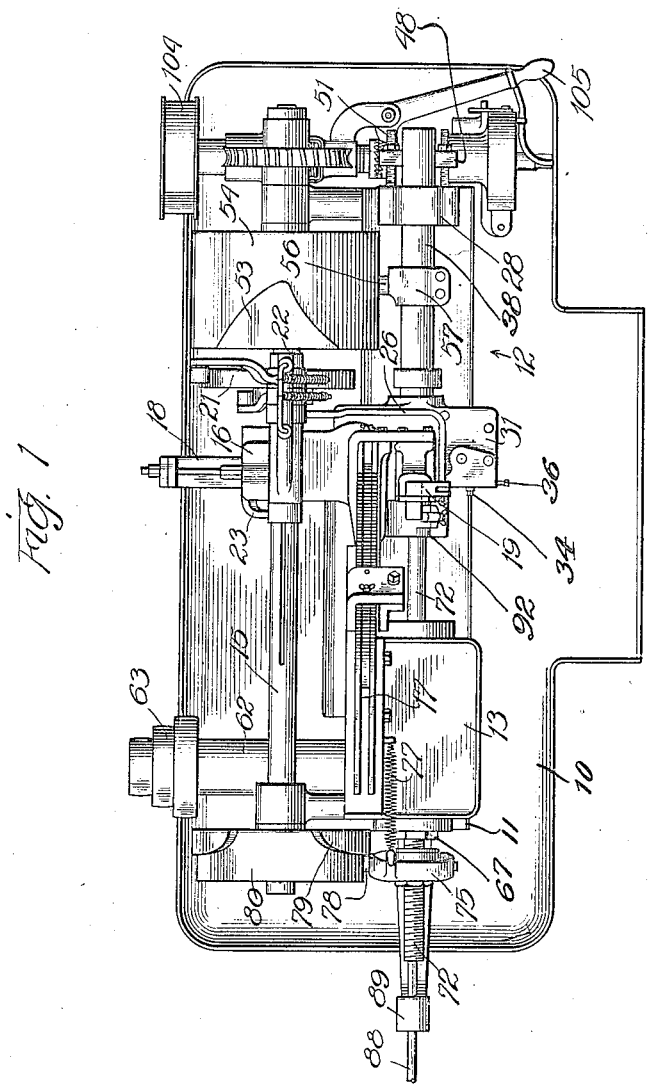

Nov. 13, 1923.

W. G. ALDEEN 1,474,132

AUTOMATIC SCREW MACHINE

Filed June 21, 1920    3 Sheets-Sheet 1

Inventor
Wilhelm G. Aldeen
By Miller Chindohl Baxter
Attys

Nov. 13, 1923.  
W. G. ALDEEN  
1,474,132  
AUTOMATIC SCREW MACHINE  
Filed June 21, 1920    3 Sheets-Sheet 2
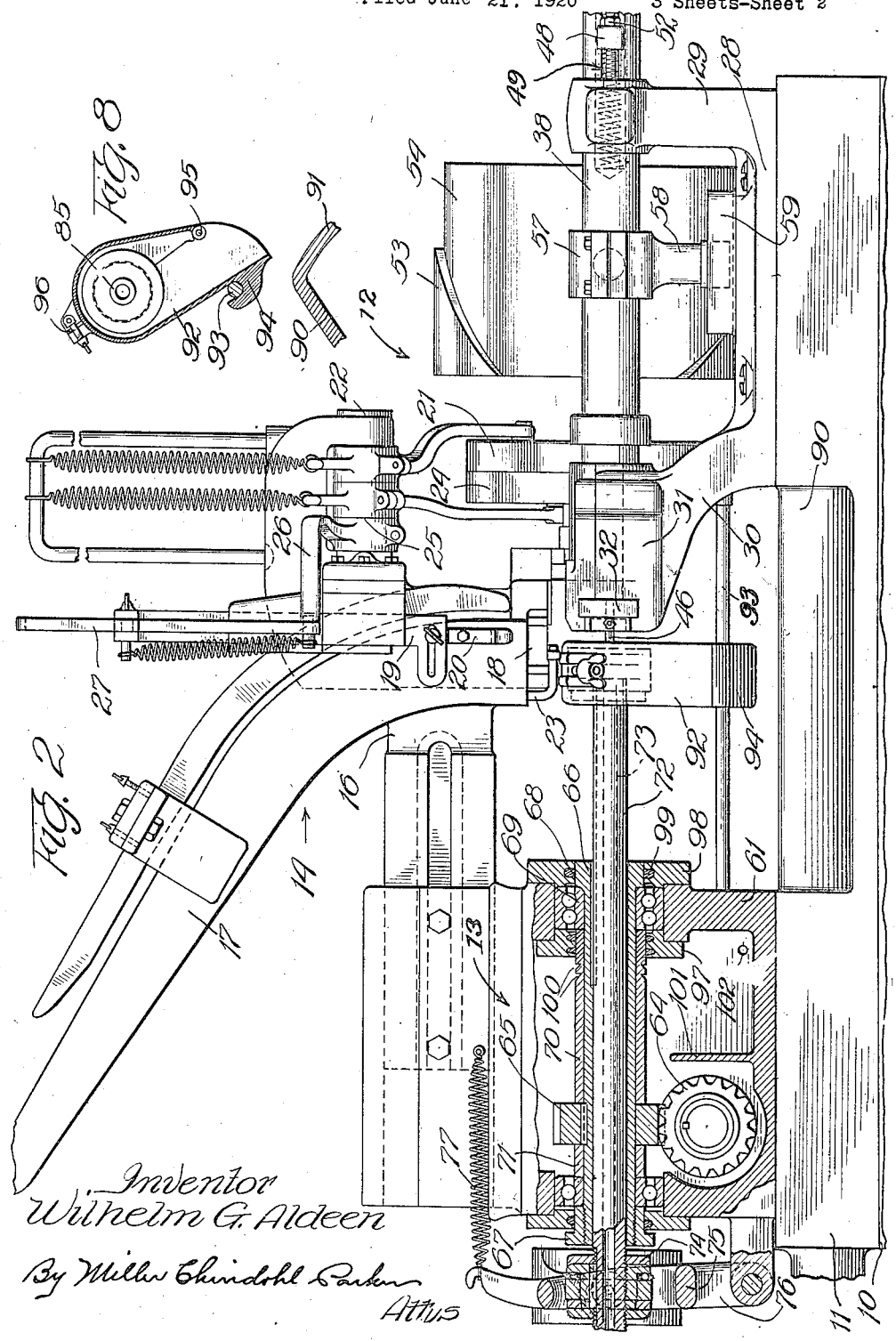
Inventor  
Wilhelm G. Aldeen  
By Miller Chindahl Parker  
Attys

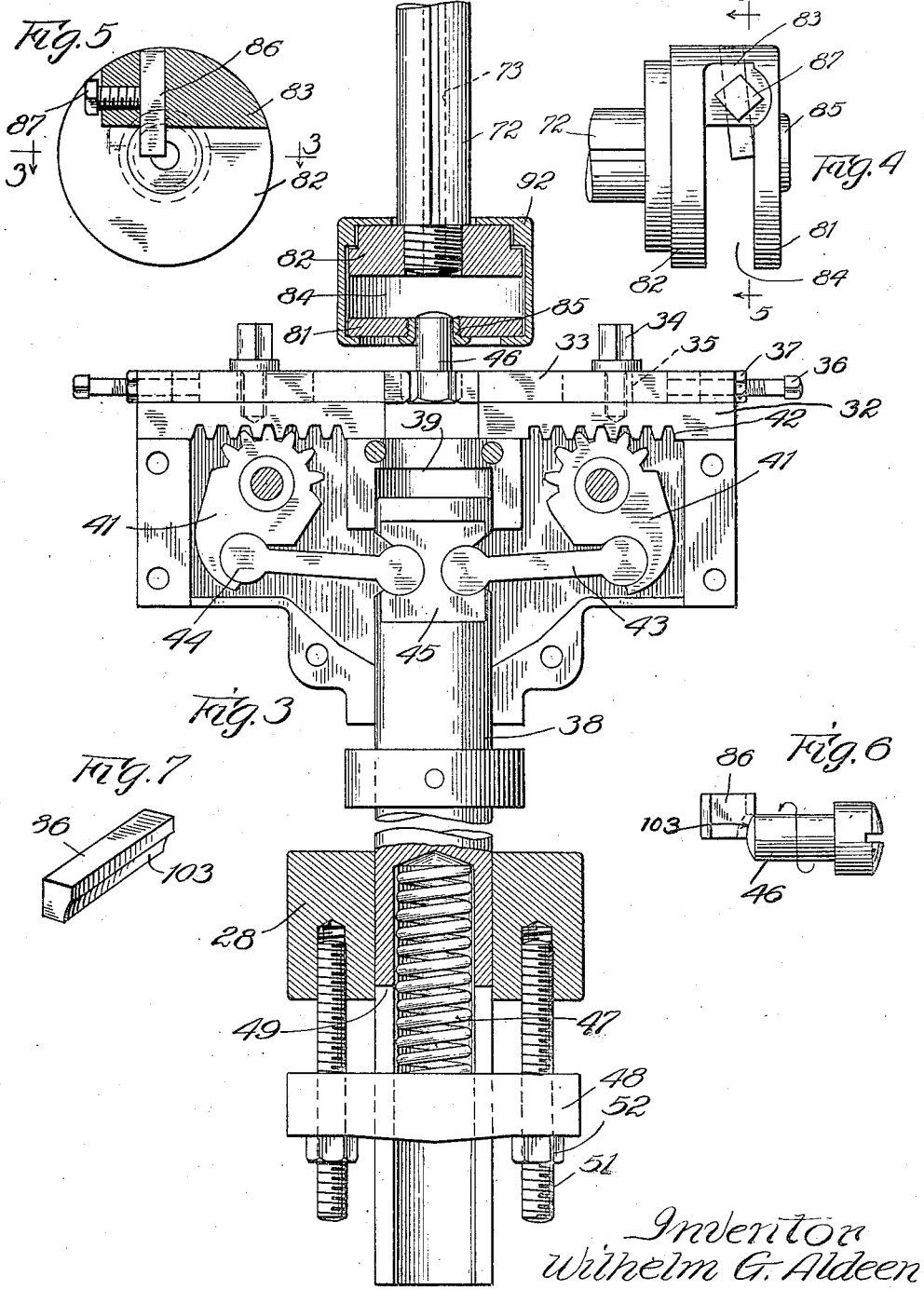

Patented Nov. 13, 1923.

1,474,132

UNITED STATES PATENT OFFICE.

WILHELM G. ALDEEN, OF ROCKFORD, ILLINOIS.

AUTOMATIC SCREW MACHINE.

Application filed June 21, 1920. Serial No. 390,531.

*To all whom it may concern:*

Be it known that I, WILHELM G. ALDEEN, a citizen of the United States, residing at Rockford, in the county of Winnebago and State of Illinois, have invented certain new and useful Improvements in Automatic Screw Machines, of which the following is a specification.

My invention relates to automatic machinery for producing duplicate machine parts in large quantities.

One object of my invention is to provide efficient means for cooling a cutting tool rotatably mounted on a spindle.

Another object is to provide means for separating cooling fluid and chips from the machined articles.

Another object is to provide a novel form of head stock for the spindle which will prevent cooling fluid from spreading to parts of the machine where its presence would be objectionable.

Another object is to provide a novel tail stock for chucking the work.

Another object is to arrange all parts of the machine so that their motion in such a direction as to act positively on some other part is controlled by springs so that blocking and jamming of any part cannot injure the machine.

Further objects and advantages of my invention will become apparent as the description proceeds.

I have illustrated my invention in connection with the system of construction disclosed in my copending application, Serial No. 393,923, filed July 3, 1920, for the purpose of further disclosing the scope of the invention set forth in the above application, and the wide variety of uses to which it may be applied.

In the accompanying drawings, Figure 1 is a plan view of a machine embodying the principles of my invention. Fig. 2 is an elevation partly in section on a larger scale, of the head stock, tail stock and feeding mechanism. Fig. 3 is a view of my improved chucking tail stock with the upper cover removed and the tool shaft and holder partly in section on the line 3—3 of Fig. 5.

Fig. 4 is a side view of the tool holder. Fig. 5 is a section of the tool holder on line 5—5 of Fig. 4. Fig. 6 is a view of one of the parts made by machine, illustrating the cutting tool in operating position with respect thereto. Fig. 7 is a perspective view of the cutting tool. Fig. 8 is a detail section of the chute for separating the chips and cooling liquid from the finished parts.

On the base 10 is mounted a subbase 11 which supports a tail stock 12 and head stock 13, which in turn supports the unitary feeding mechanism 14, and a cam shaft 15. In this set up, I employ the same head stock and unitary feeding mechanism as that disclosed in my copending application, Serial No. 393,923, hereinabove referred to, but I mount a new spindle of a different type in the head stock. The tail stock employed is a different device and of course the cams on the cam shaft 15 need to be replaced and rearranged for each different piece of work. While the same subbase 11 as that disclosed in my copending application could be employed in connection with my present invention, I prefer to use a subbase without a central pad, as illustrated.

The feeding mechanism illustrated is the same as that disclosed in my copending application and need not be described in detail. It comprises briefly a unitary casting 16 having brackets and projections for the support of a guide chute 17, a horizontal transverse slide 18 and a vertical slide 19 having resilient bolt gripping fingers 20. A cam 21 splined on the cam shaft 15 rotates the rock shaft 22 carrying the arm 23 to engage and actuate the horizontal transverse slide 18; and a similar cam 24 rotates a sleeve 25 on the rock shaft, which through an arm 26 projecting across the machine and connecting link 27 reciprocates the vertical transfer holder 19.

As the machine operates, the horizontal transfer slide 18 will receive a bolt from the end of the chute 17 and carry it over under the vertical transfer holder 19. The vertical transfer holder will be lowered to grasp the bolt, raised again to allow the horizontal slide to be withdrawn and lowered to place the bolt between the jaws of the tail stock which will automatically grasp and clamp it in position.

The tail stock 12 comprises a frame mounted on the subbase 28 and having spaced vertical portions 29 and 30. The front portion 30 supports a split casing 31 in the front of which are slidably mounted two opposing jaw carriages 32. Each carriage supports an adjustably mounted jaw 33. I have illustrated jaws 33 clamped to the face of the carriages 32 by bolts 34 entering slots 35 in the jaws, and set screws 36 equipped with lock nuts 37 for adjusting the position of the jaws. A longitudinally slidable plunger 38 enters the casing 31 and is suitably journaled where it enters the casing and in another guiding journal 39 at its end.

I have provided toggle mechanism for actuating the opposing jaw carriages 33 upon longitudinal sliding movement of the plunger, comprising rocker members 41, one for each carriage, having gear teeth engaging rack teeth 42 cut in the bottom of the carriage 32; and connecting links 43 between the plunger and the rocker members. The cylindrical end portions 44 of the connecting links 43 enter sockets in the plunger and rocker members each socket embracing a cooperating cylindrical portion throughout more than 180 degrees so that the links may operate in tension as well as compression. The working load on the links occurs however when they are under compression. Hardened bearing blocks 45 may be laid in the plunger 38 if desired to provide durable sockets for the end portions 44. It will be apparent upon reference to Fig. 3 that withdrawal of the plunger from the position illustrated will rotate the rocker members and move the carriages back to release the bolt 46.

The plunger and cooperating parts are held in the position shown in Fig. 3 by the tension of a spring 47 mounted in the hollow rear end of the plunger 38. A cross head 48 passing through slots 49 in the rear end of the plunger may have its position adjusted by bolts 51 and nuts 52 to vary the tension of the spring. To withdraw the plunger from the position illustrated in Fig. 3 I provide cams 53 (see Fig. 1) carried by a large cam drum 54 on the cam shaft 15 adapted to engage a roller 56 supported by a collar 57 clamped on the plunger 38. The collar 57 carries a downwardly projecting arm 58 reciprocating in a slotted portion 59 in the base 28 of the tail stock to prevent rotation of the collar and plunger.

The head stock illustrated is the same as that disclosed in my copending application above referred to and need not be described in detail. Briefly, it comprises a main casting 61 suitably mounted on the subbase 11 and having a laterally projecting portion 62 supporting a live axle on which the cone pulley 63 is mounted. Power is transmitted to the spindle through spiral gears 64 and 65. The spindle proper 66 is clamped in position by a nut 67 which clamps a series of annular elements embracing the spindle, between itself and the shoulder 68 at the front end of the spindle. These elements comprise the inner ring 69 of the front ball bearing, which ball bearing operates to carry both radial and thrust loads, a spacing sleeve 70, the upper spiral gear 65, another spacing sleeve 71 and the inner ring of the rear ball bearing. A tool carrying shaft 72 is splined in the spindle 66 and is hollow throughout its length as indicated at 73 for a purpose to be referred to later. It carries a collar 74 at its rear end supporting a thrust ball bearing the rear ring of which is engaged by fingers or rollers carried by a yoke 75 forming part of a pivotally mounted shifting arm 76. A tension spring 77 attached to the upper end of the arm 76 normally tends to advance the shaft 72 which will cause the tool to operate on the work. Automatic means for withdrawing the shaft 72 comprise a roller 78 carried by the yoke 75 and adapted to engage cams 79 on the cam drum 80.

The tool holder I have illustrated is threaded onto the end of the shaft 72 as clearly shown in Fig. 3, and comprises two disk like portions 81 and 82 united by an intermediate portion 83 covering part of the cross sectional area of the holder as indicated in Fig. 5 and leaving a space 84 between the disk like portions. The front disk like portion 81 is centrally apertured and threaded to receive a bushing 85 adapted to guide and support the point of the bolt during the tooling operation. The tool 86 is mounted in an aperture in the connecting portion 83 and clamped in adjusted position by a suitable set screw 87. As clearly indicated in Figs. 3 and 4, there is a large space 84 around the tool inside the tool holder.

Cooling fluid is delivered through the hollow shaft 72 into the space 84 to cool the tool and wash away the chips. For this purpose I have illustrated a pipe 88 supported by a suitable bracket 89 and entering the rear end of the shaft to deliver the fluid.

I have provided means for delivering the cooling fluid and chips at one side of the machine and allowing the bolts as they are dropped automatically from the tail stock to fall on the other side of the machine. As illustrated in Figs. 2 and 8 the central portion of the subbase 11 has a forwardly inclined portion 90 extending past the center line of the machine and joining a rearwardly inclined portion 91. The bolt 46 upon being released will fall upon the forwardly inclined portion and be deflected into a suitable receiving box such, for instance, as that disclosed in my copending application above referred to. I have provided a guide or discharge chute in the nature of a casing 92 enclosing the tool holder and opening downwardly and to the right as indicated in Fig. 8. A guide bar 93 engages a hook 94 near the lower end of the chute 92, allowing the casing to reciprocate with the motion of the shaft 72 but restraining it from rotation. The casing 92 is preferably made in two parts hinged together at 95 and held in operative position by a pivoted bolt 96 carried by one-half of the casing engaging a split lug carried by the other half of the casing.

The cooling fluid is ordinarily supplied in large quantities so that most of the parts of the machine are continuously bathed in it. I have found that it will work back into the head stock casing inside the retaining rings 97 and 98 for the outer ring of the front ball bearing, which are necessarily a loose fit on the spindle 66, even though the retaining rings carry packing 99. To prevent the fluid coming to and injuring the spiral gears 64 and 65, I provide annular depressions 100 in the spacing sleeve 70 defining a plurality of ribs on which the fluid will collect and from which it will be thrown by centrifugal force or drip if the speed is relatively low. This fluid will accumulate in the bottom of the casting being prevented from flowing to the rear by a vertical partition 101 separating the space inside the casting into two portions. A suitable bleeder hole 102 may be provided to allow the accumulated fluid to flow back into the drip pan.

Power to drive the cam shaft 15 is received by a pulley 104 and transmitted to the shaft by suitable connections including a control handle 105. As the details of this transmission are covered by my copending application Serial No. 393,923 above referred to, further description is deemed unnecessary.

The operation of my machine is as follows:

As each bolt is delivered by the vertical transfer mechanism 19, it is automatically clamped by the tail stock 12 and the carrier is then withdrawn vertically. The shaft 72 is then allowed to advance under the force of the tension spring 77, presenting the tool to the work and finishing the end of the bolt to any desired shape, for instance, to that illustrated in Fig. 6. The shaft 72 is then withdrawn and the jaws of the tail stock are automatically opened to drop the bolt 46 and receive a new bolt from the vertical transfer carrier 19.

The tool I have illustrated comprises in this instance a bar of uniform cross-section having the shape of a square with one side slightly cut in to form an arcuate portion 103. As illustrated in Fig. 4, this tool is mounted with the arcuate face 103 towards the end of the bolt and with the tool extending at a slight angle to a transverse plane. The angle to which the tool is thus set determines the clearance and the tool may be sharpened by grinding the end off square. This may be done by a relatively unskilled workman and as the socket for the tool determines the clearance angle, it is practically impossible for the operator to set the tool so that it will not do its work efficiently. It is only necessary to advance the tool to bring the cutting edge to the center line as shown in Fig. 5 and clamp it in place. The tool is then fed parallel to the axis of the bolt and the curvature of the portion 103 determines the shape of head produced.

While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. In a device of the class described, a rotary tool adapted to machine a stationary piece of stock, a rotary tubular support for said tool, and means for conducting a supply of fluid through said support to said tool, said support having a plurality of parallel annular V-shaped grooves in its outer periphery adapted as stops to limit the backward flow of fluid from the tool along the outer periphery of said support.

2. In a device of the class described, a headstock, a rotatable and slidable tool carrying member in said headstock, driving means in said headstock for rotating said member, means for passing fluid through said member, and means in said headstock for preventing fluid working into said headstock from coming in contact with said driving means.

3. In a device of the class described, a tool adapted to rotate on a horizontal axis and machine a stationary piece of stock, and a stationary casing enclosing said tool and terminating in an inclined chute.

4. In a device of the class described, a pair of opposing clamping jaws, resilient means for moving said clamping jaws into operative position, and positive means for withdrawing said clamping jaws from operative position.

5. In a device of the class described, a pair of clamping jaws, resilient means including toggle transmission elements for forcing said jaws into clamping position, and positive means for moving said jaws into open position.

6. In a device of the class described, a supporting framework, and an operating element in said framework, said element having parallel annular irregularities adjacent one end adapted to stop the flow of liquid along the outer periphery of the operating element.

7. In a device of the class described, a supporting framework, and an operating element in said framework, said element having an annular irregularity adjacent one end adapted to collect fluid, said supporting framework forming a receptacle below said operating element to contain fluid falling therefrom.

8. In a device of the class described, a supporting framework, an operating element in said framework, said element having an annular irregularity adjacent one end adapted to collect fluid, said supporting framework forming a receptacle below said operating element to receive fluid falling therefrom, and means separating said receptacle from other spaces inside said framework.

9. In a device of the class described, a supporting framework, an operating element in said framework, said element having an annular irregularity adjacent one end adapted to collect fluid, said supporting framework forming a receptacle below said operating element to receive fluid falling therefrom, means separating said receptacle from other spaces inside said framework, and power transmission elements inside said other spaces.

10. In a device of the class described, clamping jaws, a transmission including toggle mechanism for actuating said jaws, said transmission including means for adjusting the position of said jaws relative to a given position of said toggle mechanism whereby said jaws may grip articles of various sizes with said toggle mechanism in the same position for gripping each article.

11. In a device of the class described, a pair of clamping jaws, resilient means including toggle transmission elements for forcing said jaws into clamping position, positive means for moving said means into open position, and means for varying the operating tension of said resilient means.

12. In a device of the class described, a pair of clamping jaws, resilient means including toggle transmission elements for forcing said jaws into clamping position, positive means for moving said means into open position, means for varying the operating tension of said resilient means, and means for adjusting the relative positions of said toggle transmission and said clamping jaws.

13. In a device of the class described, a supporting structure, a tool supported for rotation on a horizontal axis to machine a stationary piece of stock, a stationary casing enclosing said tool and terminating in an inclined chute, said supporting structure having a portion of an inverted V-shape, the apex of said V being slightly offset laterally from the vertical plane of the axis of the machine.

14. In a device of the class described, a supporting structure, a tool supported for rotation on a horizontal axis to machine a stationary piece of stock, a casing enclosing said tool and adapted to direct chips and cooling fluid laterally, said supporting structure having a surface adapted to receive said chips and direct them laterally in one direction and another surface adapted to receive said piece of stock and direct it in a different direction.

15. In a device of the class described, a supporting framework, an operating element in said framework and means for collecting fluid adjacent one end of said element to prevent said fluid from spreading along said element.

16. In a device of the class described, a longitudinal plunger, a pair of clamping jaws, corresponding reciprocally movable jaw carriages on which said jaws are adjustably mounted, said carriages having rack teeth, toggle mechanism operatively connecting said jaw carriages with the plunger, said mechanism comprising a pair of rocker members having gear teeth engaging said rack teeth and links connecting said plunger and rocker members, resilient means operating to move said plunger links and carriages to force said jaws into clamping position, positive means for moving said plunger to release said jaws from their clamping position, means for varying the operating tension of said resilient means and means for adjusting the relative positions of said toggle transmission and said clamping jaws.

17. A machine of the character described having, in combination, a spindle mounted to rotate and also to reciprocate longitudinally, a cutter head fixed on said spindle, a housing completely surrounding said cutter head and arranged to reciprocate therewith, said housing having a discharge chute leading laterally and downwardly from the spindle and cutter head to direct away coolant and chips, and a guide bar underlying said chute arranged to support the latter to permit the housing to reciprocate with the spindle and cutter head but preventing the housing from rotating with the cutter head.

18. A machine of the character described having, in combination, a spindle mounted to rotate and also to reciprocate longitudinally, a cutter head fixed on said spindle, and a guard housing surrounding said cutter head and having a lateral outlet to direct away the refuse, said housing being supported by said cutter head or spindle and being reciprocable therewith but held from rotation.

19. A machine of the class described having, in combination, a cutter mounted to rotate and reciprocate, and a guard housing enclosing the cutter and having an outlet to direct away the refuse, said housing being supported to reciprocate with said cutter but being held against rotation with the cutter.

In testimony whereof, I have hereunto set my hand.

WILHELM G. ALDEEN.